(12) United States Patent
Ting

(10) Patent No.: US 10,254,791 B1
(45) Date of Patent: Apr. 9, 2019

(54) PORTABLE ELECTRONIC DEVICE

(71) Applicant: Primax Electronics Ltd., Taipei (TW)

(72) Inventor: Kuan-Pao Ting, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 0 days.

(21) Appl. No.: 15/879,891

(22) Filed: Jan. 25, 2018

(30) Foreign Application Priority Data

Oct. 27, 2017 (TW) .............................. 106137173 A

(51) Int. Cl.
*G06F 3/044* (2006.01)
*G06F 1/16* (2006.01)
*G06K 9/00* (2006.01)
*F21Y 115/10* (2016.01)

(52) U.S. Cl.
CPC .......... *G06F 1/1626* (2013.01); *G06F 1/1643* (2013.01); *G06F 3/044* (2013.01); *G06K 9/0002* (2013.01); *G06K 9/00033* (2013.01); *F21Y 2115/10* (2016.08)

(58) Field of Classification Search
USPC .................................... 1/1; 345/170–178, 156
See application file for complete search history.

(56) References Cited

U.S. PATENT DOCUMENTS

2017/0205923 A1\* 7/2017 Shim ..................... G06F 3/0412
2018/0068160 A1\* 3/2018 Wu ..................... G06K 9/00013

\* cited by examiner

*Primary Examiner* — Tony O Davis
(74) *Attorney, Agent, or Firm* — Kirton McConkie; Evan R. Witt

(57) ABSTRACT

A portable electronic device includes a first casing and a second casing. The first casing includes a first display module. The second casing includes a second display module. The second casing and the first casing are combined together. The second display module includes a micro LED display and an optical fingerprint sensing unit. The optical fingerprint sensing unit is located under the micro LED display.

19 Claims, 4 Drawing Sheets

PORTABLE ELECTRONIC DEVICE

FIELD OF THE INVENTION

The present invention relates to an electronic device, and more particularly to a portable electronic device.

BACKGROUND OF THE INVENTION

Recently, a fingerprint identification module has gradually become an essential component of an electronic device. The fingerprint identification module is used to recognize the identity of the user. Consequently, the user can unlock the electronic device or operates an application program through the fingerprint identification module.

Generally, the fingerprint identification module detects the fingerprint according to a capacitive fingerprint sensing technology or an optical fingerprint sensing technology. The optical fingerprint sensing technology was developed earlier. In accordance with the optical fingerprint sensing technology, an optical fingerprint sensing unit captures the light beam that is reflected from the surface of the finger, and compares the brightness/darkness difference between the fingerprint crests and the fingerprint troughs to obtain the texture details of the fingerprint of the finger. In comparison with the capacitive sensing chip of the capacitive fingerprint sensing unit, the optical fingerprint sensing chip of the optical fingerprint sensing unit is more cost-effective and more durable.

Conventionally, in case that the portable electronic device uses the capacitive fingerprint sensing technology, the capacitive sensing unit is disposed under a physical key. In case that the portable electronic device uses the optical fingerprint sensing technology, the surface of the portable electronic device is equipped with a transparent window or an opening, and the optical fingerprint sensing unit is located under the transparent window or embedded in the opening. The transparent window or the opening is used for recognizing the fingerprint only. That is, the transparent window or the opening does not provide any other function. However, the uniform and aesthetically-pleasing appearance of the portable electronic device is possibly influenced by the transparent window or the opening. If the transparent window or the opening is not completely sealed, moisture or dust possibly enters the portable electronic device through the junction between the transparent window and the portable electronic device or through the opening. Under this circumstance, the optical fingerprint sensing unit or other electronic components may be suffered from a short-circuited problem or even the portable electronic device may be suffered from breakage or damage.

For solving the drawbacks of the conventional technology, there is a need of providing a portable electronic device with a novel structure for preventing moisture or dust from entering the portable electronic device through the location of the optical fingerprint sensing unit. Moreover, the uniform and aesthetically-pleasing appearance of the portable electronic device is not adversely affected by the novel structure of the portable electronic device.

SUMMARY OF THE INVENTION

The present invention provides a portable electronic device having an optical fingerprint identification function and comprising two display modules. The portable electronic device has a novel structure for preventing moisture or dust from entering the portable electronic device through the location of the optical fingerprint sensing unit while maintaining the uniform and aesthetically-pleasing appearance of the portable electronic device.

In accordance with an aspect of the present invention, there is provided a portable electronic device. The portable electronic device includes a first casing and a second casing. The first casing includes a first display module. The second casing includes a second display module. The second casing and the first casing are combined together. The second display module includes a micro LED display and an optical fingerprint sensing unit. The optical fingerprint sensing unit is located under the micro LED display.

In an embodiment, the optical fingerprint sensing unit includes a complementary metal-oxide-semiconductor chip and a flexible printed circuit board, and the complementary metal-oxide-semiconductor chip is fixed on the flexible printed circuit board.

In an embodiment, the micro LED display includes a first transparent substrate, a second transparent substrate and plural micro LED chips. The first transparent substrate is touchable by a finger. The plural micro LED chips are arranged between the first transparent substrate and the second transparent substrate. There is a gap between every two adjacent micro LED chips of the plural micro LED chips.

In an embodiment, the plural micro LED chips include respective first electrodes and respective second electrodes. The plural micro LED chips are electrically connected with the first transparent substrate through the corresponding first electrodes and electrically connected with the second transparent substrate through the corresponding second electrodes.

In an embodiment, the portable electronic device further includes an anti-glare film layer. The anti-glare film layer is located over the first transparent substrate to be touched by the finger.

In an embodiment, the plural micro LED chips include a red LED chip, a green LED chip, a blue LED chip and an infrared LED chip.

In an embodiment, the second display module further includes a light guide layer, and the light guide layer is arranged between the second transparent substrate and the optical fingerprint sensing unit.

In an embodiment, the light guide layer includes plural light-guiding microstructures.

In an embodiment, when the infrared LED chip emits an invisible light beam to the finger, the light beam is reflected by the finger. The light beam reflected by the finger is sequentially transmitted through the first transparent substrate, the gaps between the plural micro LED chips, the second transparent substrate and the light guide layer, and transmitted to the optical fingerprint sensing unit.

In an embodiment, the first transparent substrate is made of sapphire crystal glass, tempered glass or plastic material.

In an embodiment, the second transparent substrate is made of sapphire crystal glass, tempered glass or plastic material.

In an embodiment, the first casing further includes a first lens module and a key.

In an embodiment, the second casing further includes a second lens module.

In an embodiment, the second casing is made of sapphire crystal glass, tempered glass or plastic material.

In an embodiment, the portable electronic device is a personal digital assistant or a smart phone.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
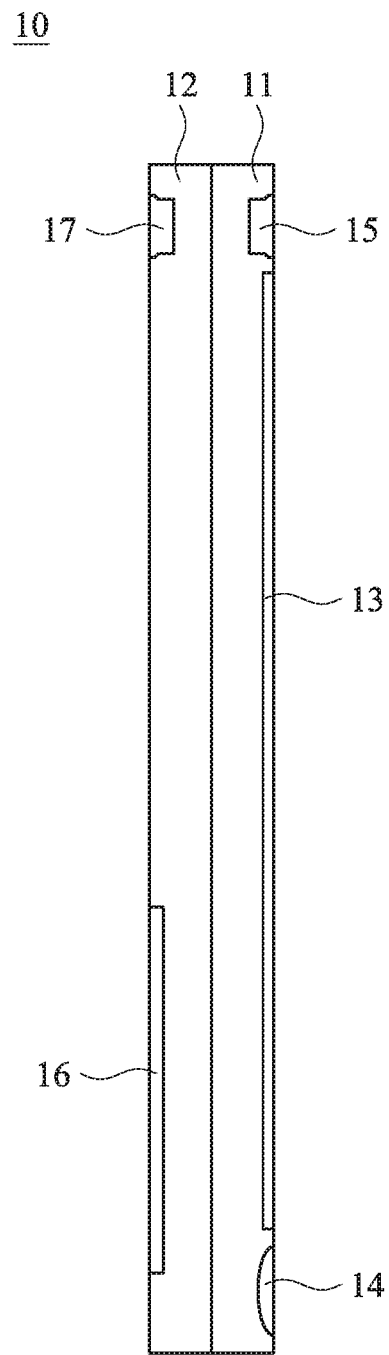
FIG. 1 is a schematic side view illustrating a portable electronic device according to an embodiment of the present invention.

FIG. 1 is a schematic side view illustrating a portable electronic device according to an embodiment of the present invention. As shown in FIG. 1, the portable electronic device 10 comprises a first casing 11 and a second casing 12. The first casing 11 and the second casing 12 are combined together. The first casing 11 comprises a first display module 13, a key 14 and a first lens module 15. The second casing 12 comprises a second display module 16 and a second lens module 17. The portable electronic device 10 is a personal digital assistant or a smart phone.

Figure 2:
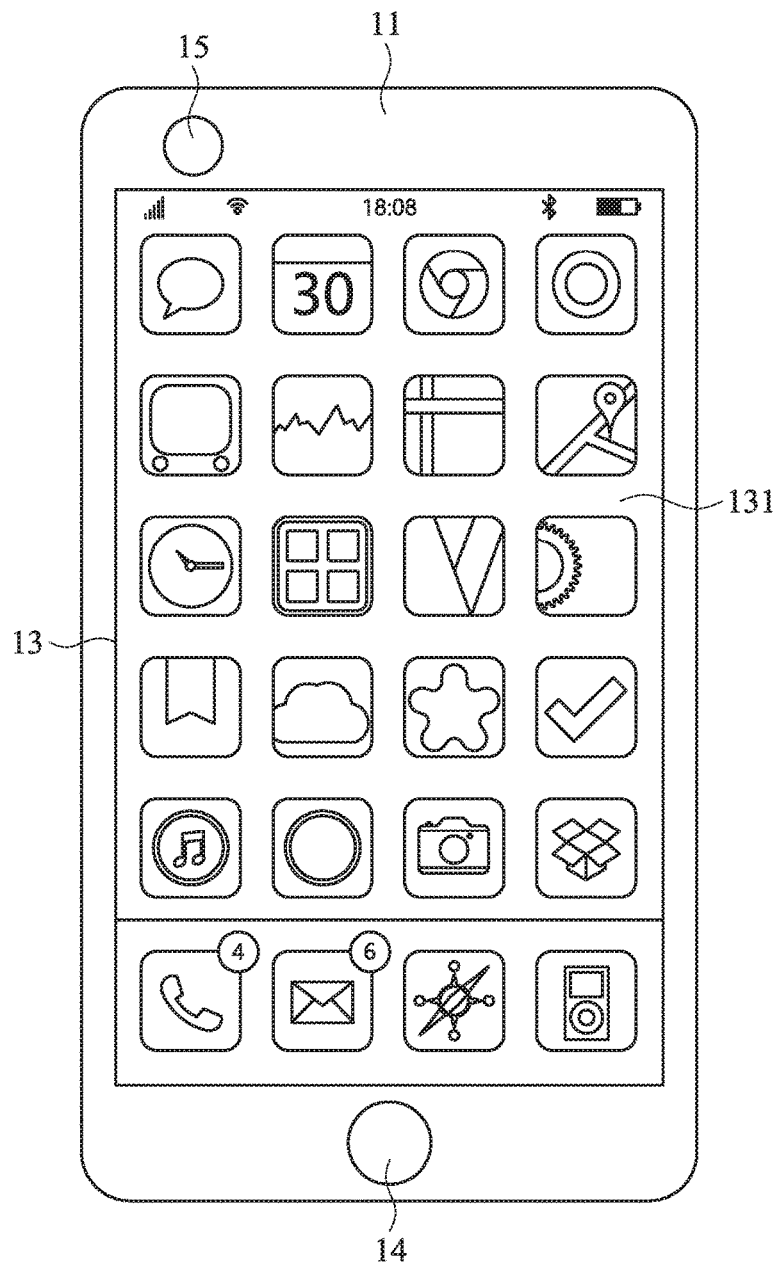
FIG. 2 is a schematic front view illustrating the portable electronic device according to the embodiment of the present invention.

FIG. 2 is a schematic front view illustrating the portable electronic device according to the embodiment of the present invention. As shown in FIG. 2, the first lens module 15 is located over the first display module 13, and the key 14 is located under the first display module 13. For example, the first display module 13 is a liquid crystal display (LCD), a light emitting diode (LED) display device or a field emission display (FED) that has a touch control function. The touch control function includes a resistive touch control function, a capacitive touch function, an acoustic-wave touch control function, optical touch function or an electromagnetic control function.

Please refer to FIG. 2 again. A first user interface 131 is shown on the first display module 13. The wireless communication signal strength, the time, the Bluetooth indication, the battery status, the icon of the application program, the mail status, the caller ID, the missed call or any other appropriate message can be shown on the first user interface 131. The user may touch the first display module 13 to operate an application program, set a system status of the portable electronic device 10, open/reply mail or dial a phone number. Alternatively, the user may touch the first display module 13 or operate the key 14 to control the first lens module 15 or the second lens module 17 to capture images.

Figure 3:
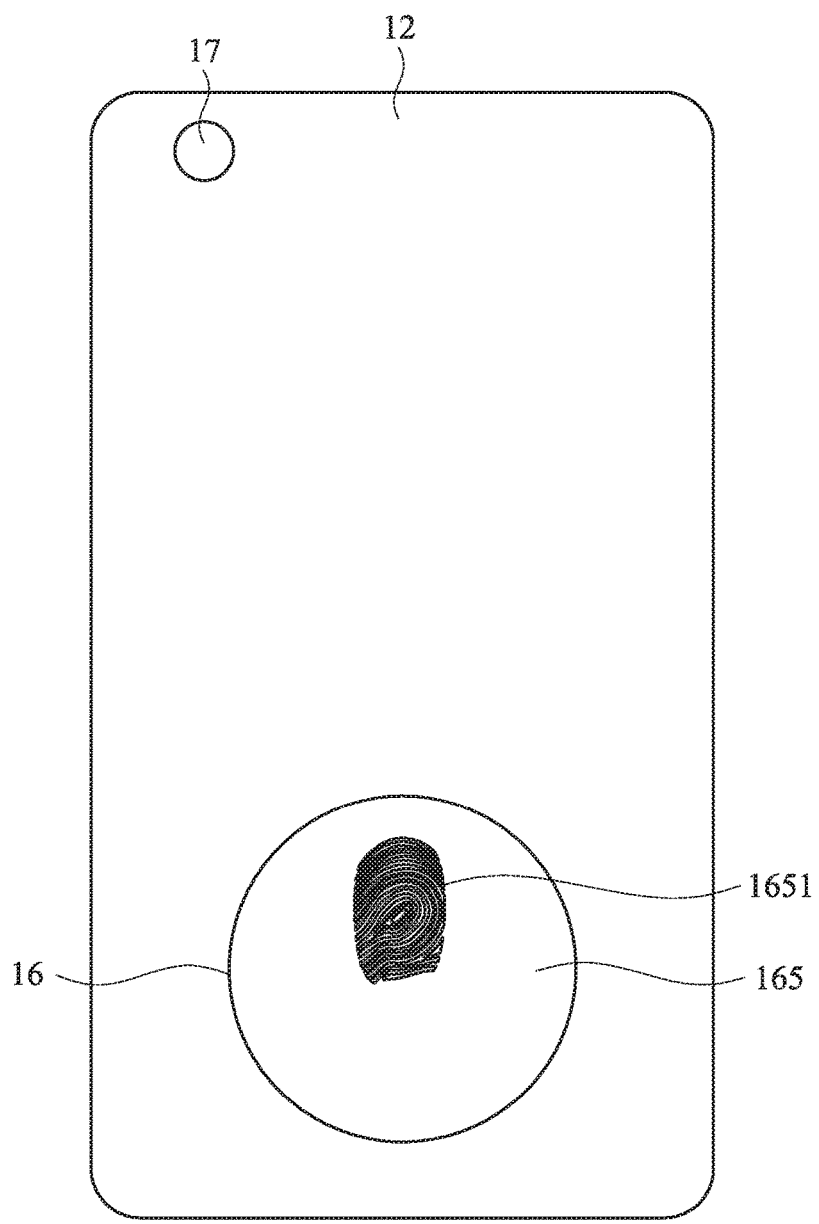
FIG. 3 is a schematic rear view illustrating the portable electronic device according to the embodiment of the present invention.

FIG. 3 is a schematic rear view illustrating the portable electronic device according to the embodiment of the present invention. As shown in FIG. 3, the second casing 12 comprises the second display module 16 and the second lens module 17. The second lens module 17 is located over the second display module 16. The second casing 12 is made of sapphire crystal glass, tempered glass, plastic material or any other appropriate transparent material. Moreover, the metallic casing readily results in a shielding effect on the wireless signal. That is, the metallic casing may interfere with the transmission of the wireless signal (e.g., the wireless charging signal, the Bluetooth signal, the WiFi signal, the ZigBee signal, the 4G signal or the 5G signal). As mentioned above, the second casing 12 is made of sapphire crystal glass, tempered glass, plastic material or any other appropriate transparent material. Consequently, the shielding effect generated by the second casing 12 is largely reduced and the strength of transmitting the wireless signal is enhanced when compared with the metallic casing. Moreover, for reducing the shielding effect of the metallic casing on the wireless signal, the conventional technology installs a wireless transmission antenna in a surface of the metallic casing to divide the metallic casing into several segment structures. Under this circumstance, the original uniform metal texture of the metallic casing is lost. In comparison with the metallic casing having the segment structures, the second casing 12 made of the sapphire crystal glass, tempered glass, plastic material or any other appropriate transparent material has an integral structure with an arc-shaped edge. Consequently, the uniform and aesthetically-pleasing appearance of the second casing 12 can be maintained. Moreover, due to the arc-shaped edge, the second casing 12 can meet the ergonomic requirement when the second casing 12 is held by the user's palm. Consequently, the comfort of holding the portable electronic device 10 with the user's palm is enhanced.

Moreover, a second user interface 165 is shown on the second display module 16. Similarly, the wireless communication signal strength, the time, the Bluetooth indication, the battery status, the icon of the application program, the mail status, the caller ID, the missed call or any other appropriate message can be also shown on the second user interface 165. In case that the second display module 16 is used for recognizing the fingerprint, the second user interface 165 contains a fingerprint identification zone 1651. When the user's finger is placed on the fingerprint identification zone 1651, a fingerprint identification operation is performed. If the result of the fingerprint identification operation confirms or recognizes the identity of the user, the user can unlock the locked status of the portable electronic device 10 or operates the corresponding application program.

Figure 4:
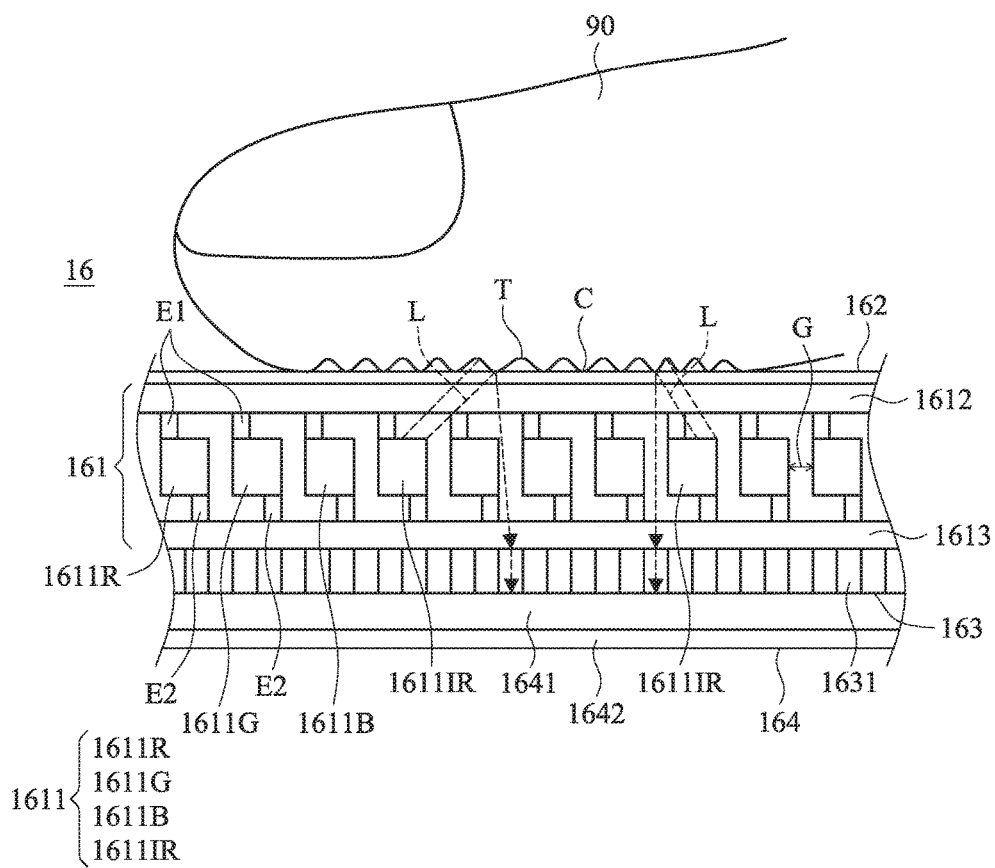
FIG. 4 is a schematic cross-sectional view illustrating the second display module of the portable electronic device according to the embodiment of the present invention.

FIG. 4 is a schematic cross-sectional view illustrating the second display module of the portable electronic device according to the embodiment of the present invention. As shown in FIG. 4, the second display module 16 comprises a micro LED display 161, an anti-glare film layer 162, a light guide layer 163 and an optical fingerprint sensing unit 164. In an embodiment, the optical fingerprint sensing unit 164 is located under the micro LED display 161. The optical fingerprint sensing unit 164 comprises a complementary metal-oxide-semiconductor (CMOS) chip 1641 and a flexible printed circuit board (FPCB) 1642. The CMOS chip 1641 is fixed on a surface of the flexible printed circuit board 1642 through a surface mount technology (SMT).

Please refer to FIG. 4 again. In an embodiment, the micro LED display 161 comprises a first transparent substrate 1612, a second transparent substrate 1613 and plural micro LED chips 1611. The plural micro LED chips 1611 are arranged between the first transparent substrate 1612 and the second transparent substrate 1613. The first transparent substrate 1612 and the second transparent substrate 1613 are made of sapphire crystal glass, tempered glass or plastic material. Since the first transparent substrate 1612 and the second casing 12 are made of the same material, the arrangement of the second display module 16 can maintain the uniform and aesthetically-pleasing appearance of the second casing 12. The plural micro LED chips 1611 comprise red LED chips 1611R, green micro LED chips 1611G, blue LED chips 1611B and an infrared LED chip 1611IR. There is a gap between every two adjacent micro LED chips 1611.

Moreover, plural thin film transistors (not shown) and plural signal electrodes (not shown) are disposed on the surface of the first transparent substrate 1612 and the second transparent substrate 1613. The plural micro LED chips 1611 are electrically connected with the corresponding thin film transistors or the corresponding signal electrodes on the first transparent substrate 1612 through first electrodes E1, and electrically connected with the corresponding thin film transistors or the corresponding signal electrodes on the second transparent substrate 1613 through second electrodes E2. Consequently, the red LED chips 1611R, the green LED chips 1611G and the blue LED chips 1611B of the micro LED chips 1611 are used as pixel/subpixel units of the second display module 16. Consequently, the second display module 16 can display active color images or gray images.

The anti-glare film layer 162 is located over the first transparent substrate 1612. While the second display module 16 is viewed by the user, the anti-glare film layer 162 can reduce the light reflection degree of the first transparent substrate 1612. In other words, the anti-glare film layer 162 is effective to reduce the visual interference from the reflected light. Moreover, while the user's finger 90 touches the second display module 16 to perform the fingerprint identification operation, the anti-glare film layer 162 can reduce the retained fingerprint trace of the finger 90 on the first transparent substrate 1612.

The light guide layer 163 is arranged between the second transparent substrate 1613 and the optical fingerprint sensing unit 164. In an embodiment, the light guide layer 163 is combined with the second transparent substrate 1613 and the optical fingerprint sensing unit 164 through an optical clear adhesive (OCA). Moreover, the light guide layer 163 comprises plural light-guiding microstructures 1631. The light-guiding microstructures 1631 comprise micro pinhole structures (not shown) or collimator lens structures (not shown) that are produced by a screen printing process. The light-guiding microstructures 1631 are used for concentrating the light beam and adjusting the travelling direction of the light beam. It is noted that the position of the light guide layer 163 is not restricted to the region between the second transparent substrate 1613 and the optical fingerprint sensing unit 164. For example, in another embodiment, the light-guiding microstructures are formed on the surface of the second transparent substrate 1613 or formed within the second transparent substrate 1613. That is, the position of the light guide layer 163 may be varied according to the practical requirements.

When the finger 90 touches the second display module 16 to perform the fingerprint recognition operation, the following procedures are performed. Firstly, the infrared LED chip 1611IR of the micro LED chips 1611 emits an invisible light beam L to the finger 90. Generally, plural crests C and plural troughs T are formed on the surface of the finger 90. When the light beam L is irradiated on the troughs T, the light beam L is scattered by the troughs T or absorbed by the finger 90. When the light beam L is irradiated on the crests C, the light beam L is reflected by the crests C. The portion of the light beam L reflected by the crests C is sequentially transmitted through the first transparent substrate 1612, the gaps between the micro LED chips 1611, the second transparent substrate 1613 and the light guide layer 163 and finally transmitted to the optical fingerprint sensing unit 164. While the light beam L is transmitted through the light guide layer 163, a pinhole image is generated through the pinhole structures of the light-guiding microstructures 1631 and projected onto the CMOS chip 1641 of the optical fingerprint sensing unit 164. Consequently, the optical fingerprint sensing unit 164 recognizes the identity of the user according to the received gray digital image corresponding to the crests C and the troughs T of the finger 90.

While the portion of the light beam L reflected by the crests C is transferred within the light guide layer 163, the travelling direction of the light beam L is adjusted by the light-guiding microstructures 1631. Under this circumstance, the strength of the optical signal received by the optical fingerprint sensing unit 164 is effectively increased. Consequently, the efficacy of the optical fingerprint sensing unit 164 to recognize the gray digital image of the fingerprint is enhanced.

From the above description, the optical fingerprint sensing unit is located under the second display module. In comparison with the conventional technology, the portable electronic device of the present invention is not additionally equipped with the transparent window or opening for fingerprint recognition. Consequently, the possibility of introducing moisture or dust into the portable electronic device through the location of the optical fingerprint sensing unit will be largely reduced. Moreover, since the micro LED display of the second display module and the second casing are made of the same material, the uniform and aesthetically-pleasing appearance of the second casing can be maintained. Moreover, since the second display module has the active image display function, the user can realize the operation status or other messages of the portable electronic device through the second display module without the need of enabling the first display module. Consequently, the power consumption of the portable electronic device is effectively reduced, and the operating time of the portable electronic device is extended. Moreover, the second display module may be used for performing the fingerprint identification operation. If the result of the fingerprint identification operation confirms or recognizes the identity of the user, the user can unlock the locked status of the portable electronic device or operates the corresponding application program. The portable electronic device with the optical fingerprint sensing unit can provide various functions. Moreover, the arrangement of the optical fingerprint sensing unit can effectively prevent moisture or dust from entering the portable electronic device while maintaining the uniform and aesthetically-pleasing appearance of the portable electronic device. In other words, the portable electronic device of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A portable electronic device, comprising:
   a first casing comprising a first display module;

a second casing comprising a second display module, wherein the second casing and the first casing are combined together, wherein the second display module comprises a micro LED display and an optical fingerprint sensing unit, wherein the optical fingerprint sensing unit is located under the micro LED display, wherein the micro LED display comprises a first transparent substrate, a second transparent substrate and plural micro LED chips, wherein the first transparent substrate is touchable by a finger, the plural micro LED chips are arranged between the first transparent substrate and the second transparent substrate, and there is a gap between every two adjacent micro LED chips of the plural micro LED chips; and an anti-glare film layer, wherein the anti-glare film layer is located over the first transparent substrate to be touched by the finger.

2. The portable electronic device according to claim 1, wherein the optical fingerprint sensing unit of the second display module comprises a complementary metal-oxide-semiconductor chip and a flexible printed circuit board, and the complementary metal-oxide-semiconductor chip is fixed on the flexible printed circuit board.

3. The portable electronic device according to claim 1, wherein the plural micro LED chips comprise respective first electrodes and respective second electrodes, wherein the plural micro LED chips are electrically connected with the first transparent substrate through the corresponding first electrodes and electrically connected with the second transparent substrate through the corresponding second electrodes.

4. The portable electronic device according to claim 1, wherein the plural micro LED chips comprise a red LED chip, a green LED chip, a blue LED chip and an infrared LED chip.

5. The portable electronic device according to claim 4, wherein the second display module further comprises a light guide layer, and the light guide layer is arranged between the second transparent substrate and the optical fingerprint sensing unit.

6. The portable electronic device according to claim 5, wherein the light guide layer comprises plural light-guiding microstructures.

7. The portable electronic device according to claim 5, wherein when the infrared LED chip emits an invisible light beam to the finger, the light beam is reflected by the finger, wherein the light beam reflected by the finger is sequentially transmitted through the first transparent substrate, the gaps between the plural micro LED chips, the second transparent substrate and the light guide layer, and transmitted to the optical fingerprint sensing unit.

8. The portable electronic device according to claim 1, wherein the first transparent substrate is made of sapphire crystal glass, tempered glass or plastic material.

9. The portable electronic device according to claim 1, wherein the second transparent substrate is made of sapphire crystal glass, tempered glass or plastic material.

10. The portable electronic device according to claim 1, wherein the first casing further comprises a first lens module and a key.

11. The portable electronic device according to claim 1, wherein the second casing further comprises a second lens module.

12. The portable electronic device according to claim 1, wherein the second casing is made of sapphire crystal glass, tempered glass or plastic material.

13. The portable electronic device according to claim 1, wherein the portable electronic device is a personal digital assistant or a smart phone.

14. A portable electronic device, comprising:
a first casing comprising a first display module; and
a second casing comprising a second display module, wherein the second casing and the first casing are combined together,
wherein the second display module comprises a micro LED display and an optical fingerprint sensing unit, wherein the optical fingerprint sensing unit is located under the micro LED display,
wherein the micro LED display comprises a first transparent substrate, a second transparent substrate and plural micro LED chips, wherein the first transparent substrate is touchable by a finger, the plural micro LED chips are arranged between the first transparent substrate and the second transparent substrate, and there is a gap between every two adjacent micro LED chips of the plural micro LED chips,
wherein the plural micro LED chips comprise a red LED chip, a green LED chip, a blue LED chip and an infrared LED chip,
wherein the second display module further comprises a light guide layer, and the light guide layer is arranged between the second transparent substrate and the optical fingerprint sensing unit,
wherein the light guide layer comprises plural light-guiding microstructures.

15. The portable electronic device according to claim 14, wherein the optical fingerprint sensing unit of the second display module comprises a complementary metal-oxide-semiconductor chip and a flexible printed circuit board, and the complementary metal-oxide-semiconductor chip is fixed on the flexible printed circuit board.

16. The portable electronic device according to claim 14, wherein the plural micro LED chips comprise respective first electrodes and respective second electrodes, wherein the plural micro LED chips are electrically connected with the first transparent substrate through the corresponding first electrodes and electrically connected with the second transparent substrate through the corresponding second electrodes.

17. The portable electronic device according to claim 14, wherein when the infrared LED chip emits an invisible light beam to the finger, the light beam is reflected by the finger, wherein the light beam reflected by the finger is sequentially transmitted through the first transparent substrate, the gaps between the plural micro LED chips, the second transparent substrate and the light guide layer, and transmitted to the optical fingerprint sensing unit.

18. The portable electronic device according to claim 14, wherein the first transparent substrate is made of sapphire crystal glass, tempered glass or plastic material.

19. The portable electronic device according to claim 14, wherein the second transparent substrate is made of sapphire crystal glass, tempered glass or plastic material.

* * * * *